US 11,745,878 B2

(12) United States Patent
Hallford et al.

(10) Patent No.: US 11,745,878 B2
(45) Date of Patent: Sep. 5, 2023

(54) ADDITIVE MANUFACTURED AIRCRAFT SEAT COMPONENTS

(71) Applicant: Safran Seats USA LLC, Gainesville, TX (US)

(72) Inventors: James A. Hallford, Sanger, TX (US); Jeremy Green, Lantana, TX (US); Kevin M. Waters, Denton, TX (US); Jodi Presswood, Argyle, TX (US)

(73) Assignee: Safran Seats USA LLC, Gainesville, TX (US)

( * ) Notice: Subject to any disclaimer, the term of this patent is extended or adjusted under 35 U.S.C. 154(b) by 163 days.

(21) Appl. No.: 17/599,815

(22) PCT Filed: Mar. 29, 2019

(86) PCT No.: PCT/US2019/024965
§ 371 (c)(1),
(2) Date: Sep. 29, 2021

(87) PCT Pub. No.: WO2020/204889
PCT Pub. Date: Oct. 8, 2020

(65) Prior Publication Data
US 2022/0177138 A1    Jun. 9, 2022

(51) Int. Cl.
*B64D 11/06* (2006.01)
*B64D 11/00* (2006.01)

(52) U.S. Cl.
CPC .... *B64D 11/0619* (2014.12); *B64D 11/00151* (2014.12); *B64D 11/0624* (2014.12); *B64D 11/0636* (2014.12); *B64D 11/0638* (2014.12)

(58) Field of Classification Search
CPC .......... B64D 11/0619; B64D 11/00151; B64D 11/0624; B64D 11/0636; B64D 11/0638
See application file for complete search history.

(56) References Cited

U.S. PATENT DOCUMENTS

| 8,857,904 B2* | 10/2014 | Gaeng | B60N 2/885 |
| | | | 297/216.12 |
| 10,737,598 B2* | 8/2020 | Tamaki | B60N 2/646 |
| 10,870,375 B2* | 12/2020 | Recktenwald | B60N 2/42781 |
| 10,913,535 B2* | 2/2021 | Udriste | B64D 11/0647 |
| 11,279,274 B1* | 3/2022 | Selvasekar | B60N 2/80 |

(Continued)

FOREIGN PATENT DOCUMENTS

| WO | 2015143021 A1 | 9/2015 |
| WO | 2015171856 A1 | 11/2015 |

OTHER PUBLICATIONS

International Patent Application No. PCT/US2019/024965, International Search Report and Written Opinion, dated Dec. 6, 2019.

*Primary Examiner* — Philip F Gabler
(74) *Attorney, Agent, or Firm* — Kilpatrick Townsend & Stockton LLP (57) ABSTRACT

A passenger includes at least one seat component including a first material and at least one additive manufactured component including a second material, the at least one additive manufactured component including a plurality of zones. The at least one additive manufactured component is attached to the at least one seat component. The at least one additive manufactured component includes a lattice structure. Each of the plurality of zones have different physical properties.

20 Claims, 7 Drawing Sheets

(56) References Cited

U.S. PATENT DOCUMENTS

| | | |
|---|---|---|
| 2018/0043805 A1 | 2/2018 | Baek et al. |
| 2018/0222592 A1 | 8/2018 | Tiwari et al. |
| 2019/0054847 A1 | 2/2019 | Lang et al. |
| 2021/0069948 A1* | 3/2021 | Selvasekar ............ B29C 44/356 |
| 2021/0259425 A1* | 8/2021 | Michalak ................ A47C 7/282 |
| 2022/0177138 A1* | 6/2022 | Hallford .............. B60N 2/7017 |

* cited by examiner

ADDITIVE MANUFACTURED AIRCRAFT SEAT COMPONENTS

FIELD OF THE INVENTION

The field of the invention relates to additive manufactured components for passenger seats in aircraft or the like.

BACKGROUND

Passenger seats, and particularly vehicle or aircraft passenger seats, are designed to ensure passenger safety for various loading conditions including, for example, hard landings and crash conditions. In some instances, regulatory and/or governmental requirements dictate that seats comply with occupant protection/head impact tests. The general intent is that the seat is designed to reduce or minimize impact forces transferred to a passenger's head from the seatback on a forward side of the passenger during an impact after the passenger from a row behind the seat moves forward (due to rapid deceleration of the vehicle or aircraft). Reducing head accelerations/decelerations and the related forces decrease the likelihood of head trauma and head injuries. However, the seats must also withstand typical non-crash load abuse, such as passengers leaning heavily against the seat, using the seat as a brace, and other non-crash loading conditions.

These passenger seats are designed based on numerous additional factors including, for example, manufacturing considerations, minimizing weight and cost, enhancing comfort, aesthetics, and convenience. Traditional materials for seat components include injection-molded plastic, vacuum formed plastic, and other materials.

In certain situations, it may be desirable to design passenger seat components with customized layers of materials having varying properties designed for specific purposes such as interacting with portions of a passenger's body based on anatomical traits to maximize safety for the passenger while simultaneously optimizing other factors including, for example, weight and strength.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat comprises: at least one seat component comprising a first material; at least one additive manufactured component comprising a second material, the at least one additive manufactured component comprising a plurality of zones, wherein: the at least one additive manufactured component is attached to the at least one seat component; the at least one additive manufactured component comprises a lattice structure; and each of the plurality of zones comprises different physical properties.

The at least one additive manufactured component, in certain embodiments, comprises a material having isotropic properties.

In certain embodiments, each of the plurality of zones comprises a different density.

In some embodiments, each of the plurality of zones comprises a different geometry of lattice structure.

In some embodiments, the at least one additive manufactured component is arranged in a head impact region on a rear side of the passenger seat.

The at least one additive manufactured component, in certain embodiments, comprises an outer surface that is contiguous with an outer surface of the at least one seat component.

The first material of the at least one seat component, in some embodiments, comprises injection-molded thermoplastic and the second material is different than the first material.

In some embodiments, the at least one seat component comprises a seat shroud on a rear side of the passenger seat.

In certain embodiments, the at least one additive manufactured component is designed to deflect and absorb more energy based on impact loads compared to the at least one seat component.

In some embodiments, the at least one additive manufactured component comprises provisions for mounting fasteners for attachment of the at least one additive manufactured component to the at least one seat component.

The at least one additive manufactured component, in certain embodiments, comprises provisions for a modular attachment for a removable component on a rear side of the passenger seat.

In certain embodiments, the removable component comprises at least one selected from the group of an electrical charging unit, a coat hook, a tray table, a literature pocket, a mirror, a video monitor, and a cup holder.

In some embodiments, the lattice structure of the at least one additive manufactured component comprises a three dimensional volumetric structure that includes at least one from the group of tetrahedral, rhombic, hexagonal, and cubic structure.

According to certain embodiments of the present invention, an additive manufactured component for a passenger seat comprises: a lattice structure comprising a three dimensional volumetric structure; and a plurality of zones, wherein: the additive manufactured component is attached to a seat component; and each of the plurality of zones comprises different physical properties.

In certain embodiments, the additive manufactured component comprises at least one from the group of a cushion, a headrest, and a rear shroud.

In some embodiments, the additive manufactured component comprises isotropic properties.

Each of the plurality of zones, in certain embodiments, comprises a different density.

In certain embodiments, each of the plurality of zones comprises a different geometry of lattice structure.

In some embodiments, the additive manufactured component is arranged in a head impact region on a rear side of the passenger seat.

In certain embodiments, the additive manufactured component comprises an outer surface that is contiguous with an outer surface of the seat component.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1A:
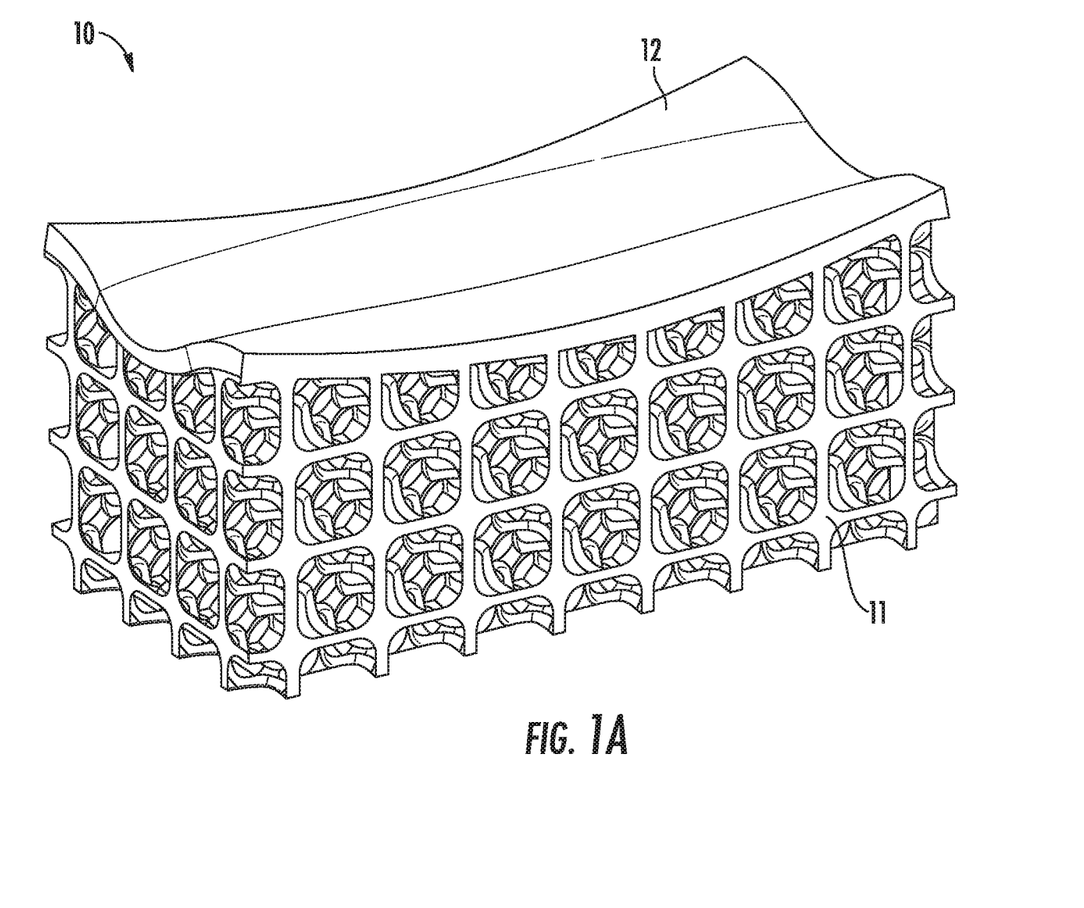
FIG. 1A is a perspective view of an additive manufactured component according to certain embodiments of the present invention.

FIGS. 1A-1D illustrate exemplary embodiments of components 10 of a passenger seat where the component 10 is manufactured by additive manufacturing techniques. FIGS. 2-5B show examples of passenger seat assemblies 100 that may include at least one component 10 manufactured by additive manufacturing techniques for vehicles such as an aircraft. FIG. 1A shows an exemplary embodiment of a component 10 that includes a lattice structure 11 and an outer surface 12, where the outer surface 12 may be contoured and/or may include compound curves to match the outer surface of other seat components. In some embodiments, the outer surface 12 is contiguous with an outer surface of an adjacent component (i.e., part of passenger seat assembly 100).

In some embodiments, the lattice structure 11 includes three dimensional volumetric structures with struts that form shapes including, but not limited to, tetrahedral, rhombic, hexagonal, dode, cubic, body-centered cubic, or any other appropriate shape. The structures (or cells) can be scaled uniformly, non-uniformly, and/or may be rotated. The thickness/diameter of the struts may vary throughout the lattice structure 11. The overall density for a specific portion of the lattice structure 11 depends on at least (i) the thickness/diameter of the struts and (ii) the size of the volumetric structure (i.e., the amount of empty space). For some portions of the component 10, the lattice structure 11 may include two dimensional surface structures.

Figure 1B:
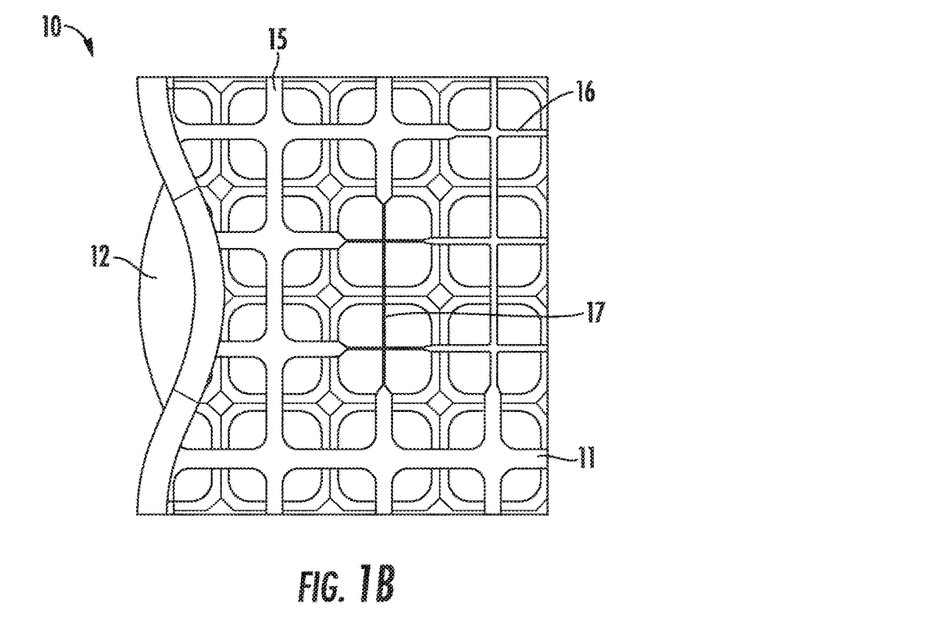
FIGS. 1B, 1C, and 1D are side views of the additive manufactured component of FIG. 1A.
Figure 1C:
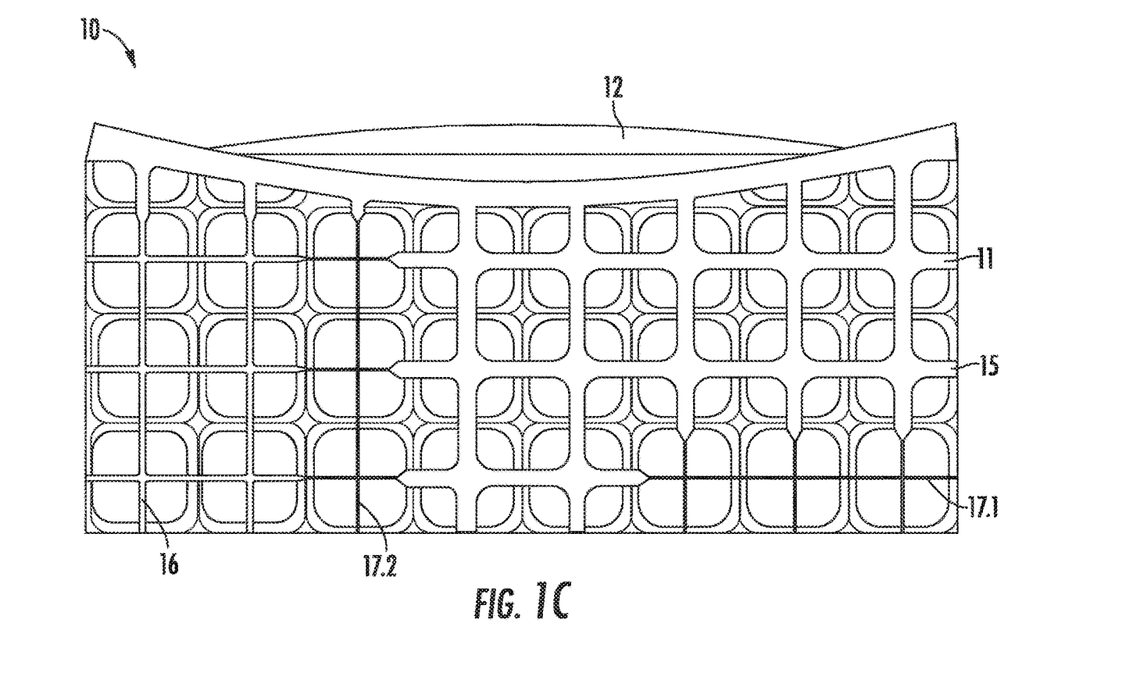
Figure 1D:
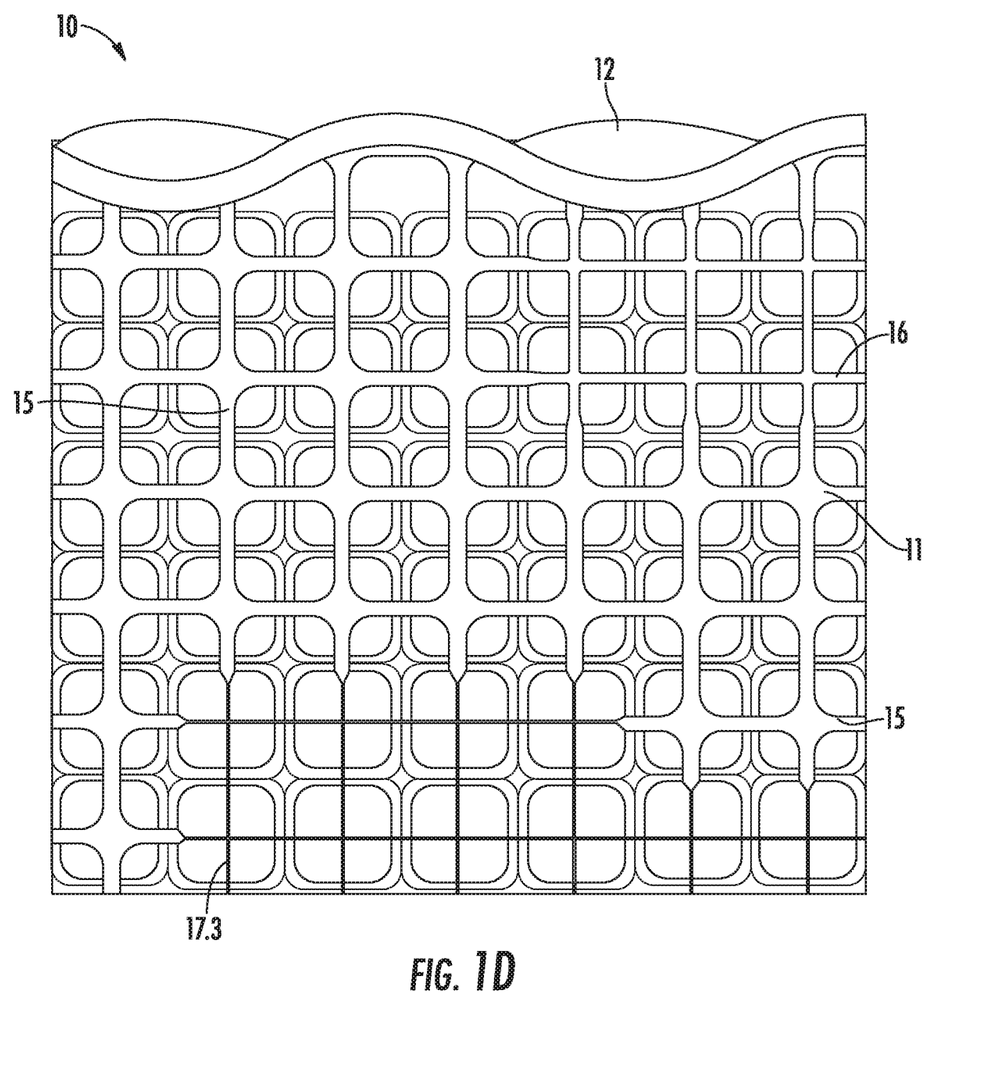
Figure 2:
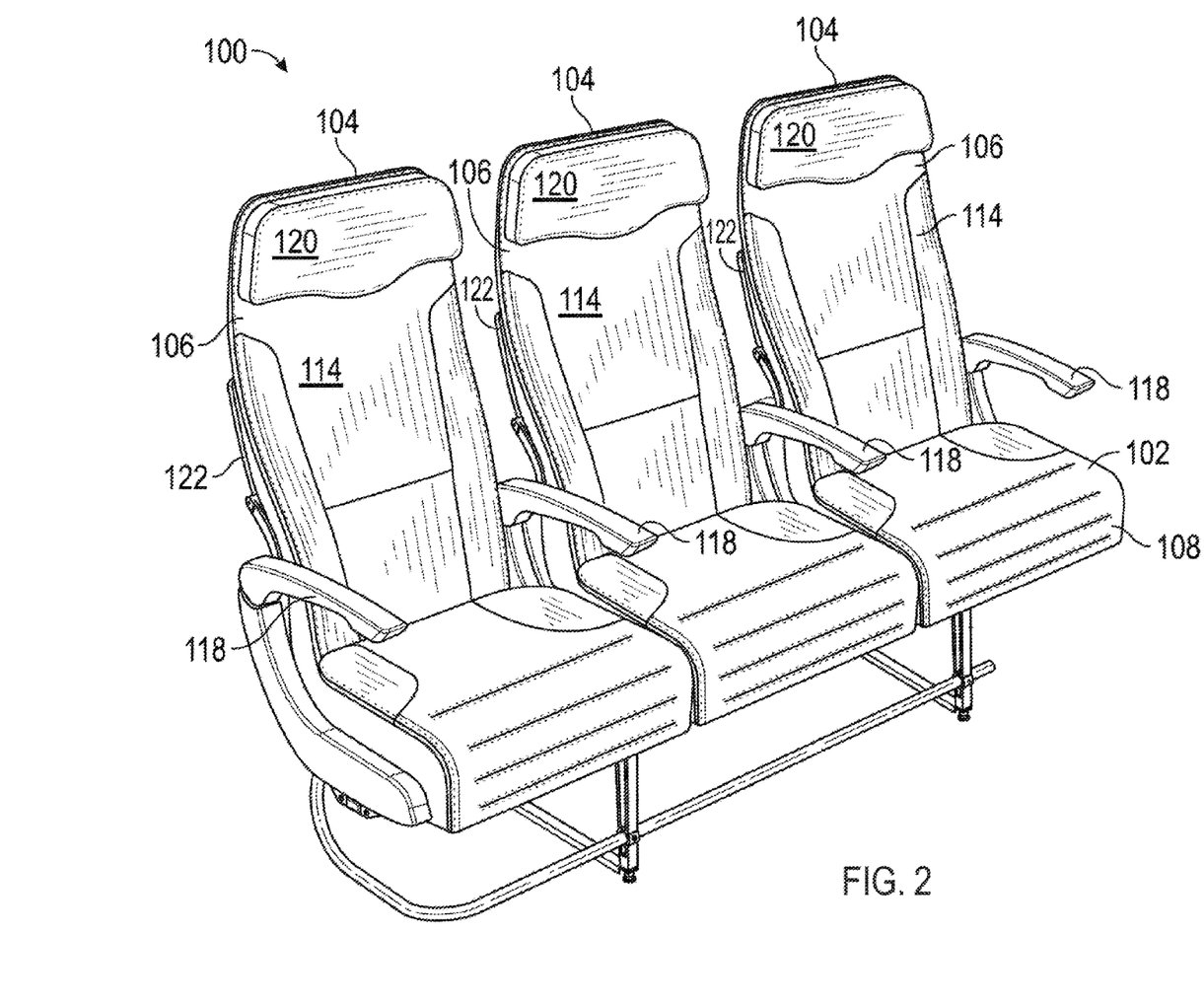
FIG. 2 is a front perspective view of a passenger seat assembly according to certain embodiments of the present invention.

As shown in FIGS. 1B-1D, the lattice structure 11 may include multiple zones and/or layers with different properties. The various zones/layers of the lattice structure 11 may be designed for specific function(s) based on various differences and/or physical properties between the zones/layers. The physical properties may include, for example, density, strut thickness, cell geometry, cell size, cell orientation, layer thickness, material, or any other relevant parameter. The zones/layers may be designed for optimizing functions such as energy absorption, reduced weight, modularity, or any other appropriate function. For example, the lattice structure 11 may include a first zone 15 with a first density, a second zone 16 with a second density, and a third zone 17 with a third density. In some embodiments, the first density is a high density, the second density is a medium density, and the third density is a low density. Although FIGS. 1B-1D illustrate embodiments with three zones with differing properties, the lattice structure 11 may include any number of zones and/or layers having different properties.

Some embodiments of a passenger seat assembly 100 (see FIGS. 2-5B) may be designed to include at least one component 10 manufactured by additive manufacturing techniques, as described above. For example, surfaces on a rear side of the seat (see FIGS. 3-5B) may include at least one component 10 designed to optimize energy absorption properties. In particular, areas where head impacts (from the passenger seated behind the passenger seat assembly 100) are most likely to occur can be designed to include a component 10.

In some embodiments, the component 10 manufactured by additive manufacturing techniques is isotropic, while in other embodiments, the component 10 has reduced strength in at least one direction (some additive manufactured components have reduced strength in the direction in which the layers are deposited). The component 10 may be manufactured in a binder jetting process, a metal binder jetting process, a metal powder bed fusion process, a direct metal laser sintering process, a selective laser sintering process, a selective laser melting process, a continuous liquid interface production process, a stereo lithography process, a fused deposition modeling process, a fused filament fabrication process, a computed axial lithography process, or any other appropriate process.

Each passenger seat assembly 100 may include at least one seat base 102, at least one backrest 104, and at least one armrest 118. Each backrest 104 may have a forward-facing side 114 and an aft-facing side 116 (see FIGS. 2 and 3). When a passenger is seated, the forward-facing side 114 may interface with and/or support the passenger. The aft-facing side 116 generally faces away from the passenger when used. In various examples, passenger vehicles, such as aircraft, include multiple rows of passenger seat assemblies 100, and the aft-facing side 116 of one passenger seat faces a passenger in an aft row.

In some embodiments, the backrest 104 may include a backrest shroud 106 that covers at least some of the internal portions of the seat (including, for example, cushioning members, frame members, and/or headrests 120). Similarly, the base 102 may include a base cover 108 that covers at least some of the internal portions of the seat (including, for example, cushioning members and frame members). In some cases, the passenger seat assembly 100 may also optionally include an upper module 128. In some embodiments, the upper module 128 includes an In-Flight Entertainment (IFE) monitor (see FIGS. 3 and 4), an upper literature pocket (see FIGS. 5A and 5B), or any other appropriate component. The passenger seat assembly 100 may also include a lower literature pocket 130.

In some embodiments, at least a portion of the backrest shroud 106 and/or the upper module 128 may include a component 10 manufactured by additive manufacturing techniques, as described above. In some cases, the entirety of the backrest shroud 106 and/or the upper module 128 may be produced by additive manufacturing techniques, while in other embodiments, an insert for a specific portion of one or both of these components may be produced by additive manufacturing techniques. The backrest shroud 106 and/or the upper module 128 may include areas relevant to head impact criteria (HIC) testing and accordingly may be designed based on energy absorption characteristics to minimize the energy transferred to a passenger's head upon impact. In some embodiments, the zones/layers are designed using finite element analysis (FEA) to adjust the material properties. As shown in FIG. 1B, in some examples of the backrest shroud 106 and/or the upper module 128, the component may include a dense zone/layer (first zone 15) adjacent to the outer surface 12, which acts as a load distribution zone/layer that dissipates and distributes energy to reduce localized effects due to impacts. Accordingly, the load distribution zone/layer may ensure that point impacts are spread across large portions of the component. The component 10 may include at least one internal zone/layer with a lower density behind the first zone 15. For example, FIG. 1B shows second zone 16 and a third zone 17 on an internal side of the first zone 15. The second zone 16 and/or the third zone 17 may function as an energy absorption zone/layer designed to compress and to absorb energy associated with linear and/or rotational accelerations, which will reduce the force/energy transmitted to the passenger.

Although FIG. 1B shows a first zone 15 (load distribution zone/layer) that includes a single layer of volumetric structures before the third zone 17 and second zone 16 (energy absorption zones/layers), the first zone 15 may include any number of layers of volumetric structures. For example, FIG. 1C illustrates an example where the first zone 15 (load distribution zone/layer) includes two layers of volumetric structures before the third zone 17.1 (energy absorption zone/layer). In addition, FIG. 1D shows an example where the first zone 15 (load distribution zone/layer) includes four layers of volumetric structures before the third zone 17.3 (energy absorption zone/layer).

In some embodiments, the component 10 may be designed such that the second zone 16 is adjacent to the outer surface 12 (see FIGS. 1C and 1D) or a third zone 17 is adjacent to the outer surface 12 (see layer 17.2 in FIG. 1C). Locating the energy absorption zone/layer near the outer surface 12 may be based on (1) a need for compression or energy dissipation near the surface of the component 10; (2) a need to reduce weight; (3) reduced strength requirements for the component 10 in the designated area; and/or any other appropriate reason.

As shown in FIGS. 3-5B, a tray table 122 may be attached to the passenger seat assembly 100. The tray table 122 may be movable between a stowed position (see FIG. 3) and a deployed position (see FIG. 4). In the stowed position, the tray table 122 is adjacent and approximately parallel to the backrest 104, and an upper surface 126 of tray table 122 faces the aft-facing side 116 of the backrest 104 while a lower surface 124 of the tray table 122 faces away from the aft-facing side 116. In the deployed position, the tray table 122 is pivoted and/or translated from the backrest 104, and the upper surface 126 is approximately horizontal and faces upward. In the deployed position, a passenger from the next row aft may optionally place various items or belongings on the upper surface 126 (see FIG. 4).

As discussed above in the context of the backrest shroud 106 and the upper module 128, at least a portion of the tray table 122 may include a component 10 manufactured by additive manufacturing techniques. In some cases, the entirety of the tray table 122 may be produced by additive manufacturing techniques, while in other embodiments, an insert for a specific portion of the tray table 122 may be produced by additive manufacturing techniques. The lower surface 124 of the tray table 122 (when the tray table 122 is stowed) may include areas relevant to HIC testing and accordingly may be designed based on energy absorption characteristics to minimize the energy transferred to a passenger's head upon impact (similar to the backrest shroud 106 and the upper module 128). All of the description related to the various zones/layers for the component 10 described above are also applicable for the tray table 122.

Figure 3:
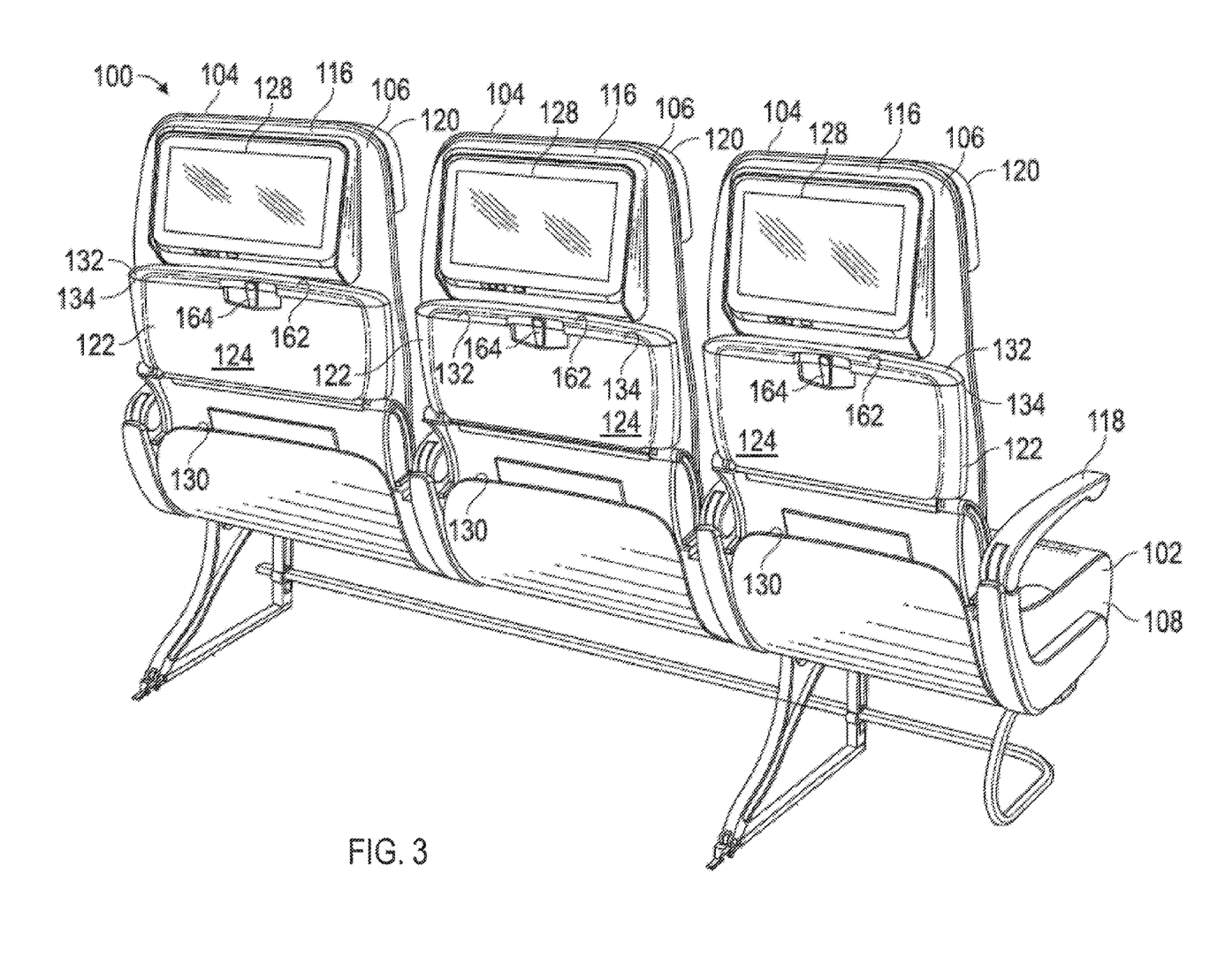
FIG. 3 is a rear perspective view of the passenger seat assembly of FIG. 2.
Figure 4:
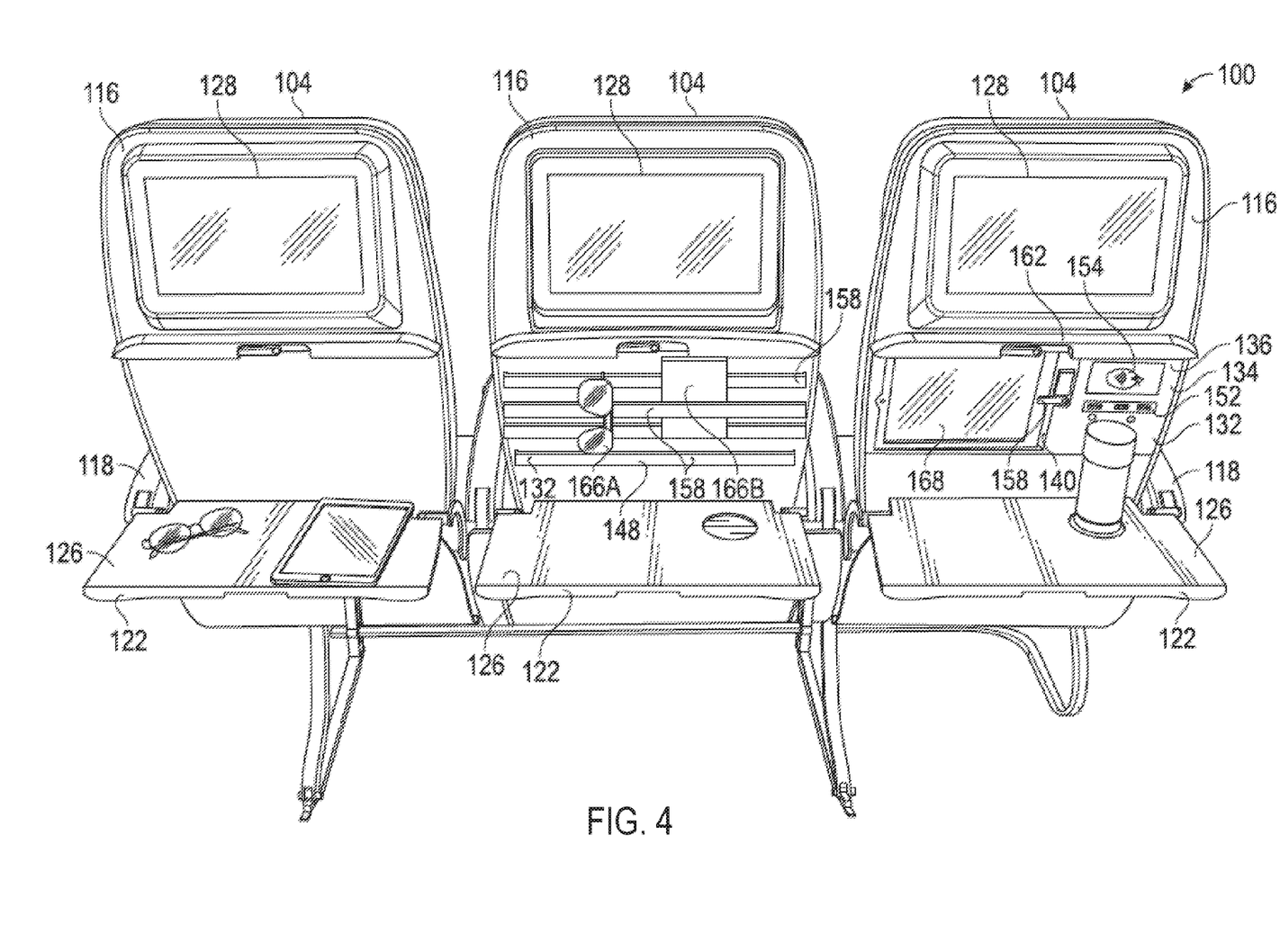
FIG. 4 is a rear view of the passenger seat assembly of FIG. 2.

As shown in FIGS. 3 and 4, the passenger seat assembly 100 may include an amenities panel 132. The amenities panel 132 may include a body 134 and at least one convenience feature. The amenities panel 132 may be connected to a rear side of the passenger seat assembly 100. In some examples, each backrest 104 includes an amenities panel 132. The amenities panel 132 is provided at a location on the backrest 104 that is between the upper surface 126 of the tray table 122 and the forward-facing side 114 of the backrest 104 when the tray table 122 is stowed. The amenities panel 132 may include a ledge 162 configured to abut an edge of the tray table 122 when the tray table 122 is in the stowed position (see FIG. 3). In some of these examples, the ledge 162 may include a latch 164 or other securing mechanism suitable for retaining the tray table 122 in the stowed position.

The body 134 of the amenities panel 132 includes an aft-facing side 136 that faces outward from the backrest 104. When the tray table 122 is stowed, the aft-facing side 136 faces the upper surface 126 of the tray table 122. In some embodiments, the body 134 is dimensioned such that the amenities panel 132 is substantially covered by the tray table 122 when the tray table 122 is stowed. For example, in some cases, a majority of the aft-facing side 136 may be covered by the tray table 122 when the tray table 122 is stowed. In such examples, the amenities panel 132 may be hidden from view when the tray table 122 is stowed (see FIG. 3).

As described above, the amenities panel 132 may include at least one convenience feature. The at least one convenience feature may enhance the travel experience for a passenger. In some cases, the convenience feature may be various stowage or holder features including, but not limited to, an electronics holder 140, an auxiliary unit 146, a universal holder 148, a shelf 150 (see FIGS. 3-5B), and various other stowage or holder mechanisms. The shelf 150 may include a body 170. The amenities panel 132 may define a cavity 160 configured to receive the auxiliary unit 146 when the auxiliary unit 146 is in the stowed position. The auxiliary unit 146 may include a cup holder, a coat hook, a mirror, or any other appropriate feature. The convenience feature may also include various connectivity features including, but not limited to, connectors such as USB ports 152, outlets or other ports, audio connectors, a wireless charging system 154, and various other connectivity features. In certain examples, some of the connectivity features may be concealed by covers when not in use. In certain cases, the covers may include a graphic, decal, text, or various other indicators indicating the type of connectivity feature concealed by the particular cover. Compared to the literature pocket 130, these stowage or holder features on the amenities panel 132 are more easily accessible, at a higher position such that they are visually in front of the passenger, and allows for quick retrieval of any stored items. In some cases, these stowage features may be recessed into the amenities panel 132, although they need not be. In various examples, these stowage features optionally include retainers 158 to aid in retaining stowed items with the respective feature. The retainers 158 may be various retaining mechanisms including, but not limited to, latches, hooks, hook and loop fasteners, flexible bands, pins, bolts, snap-fit connectors, and various other suitable retaining mechanisms. In some examples, the type of retainer 158 may depend on the type of stowage feature. For example, referring to FIG. 4, the universal holder 148 may include a plurality of retainers 158 that are elastic bands to retain passenger items 166A-B, while the electronics holder 140 includes a retainer 158 that is a latch to retain a tablet device 168 in position.

Similar to the backrest shroud 106, the upper module 128, and the tray table 122, at least a portion of the amenities panel 132 may include a component 10 manufactured by additive manufacturing techniques. In some cases, the entirety of the amenities panel 132 may be produced by additive manufacturing techniques, while in other embodiments, an insert for a specific portion of the amenities panel 132 may be produced by additive manufacturing techniques. When the tray table 122 is deployed, the amenities panel 132 may include areas relevant to HIC testing and accordingly may be designed based on energy absorption characteristics to minimize the energy transferred to a passenger's head upon impact (similar to the backrest shroud 106 and the upper module 128). All of the description related to the various zones/layers for the component 10 described above are also applicable for the amenities panel 132 (or portions thereof).

For embodiments where a specific portion of the backrest shroud 106, the upper module 128, the tray table 122, and/or the amenities panel 132 is a component 10 manufactured by additive manufacturing techniques, the remaining portions of the component may be manufactured using more conventional method and materials. For example, parts of the component may include injection-molded thermoplastic that is created using a mold or a component that is vacuum formed. Because the mold for creating an injection-molded thermoplastic component is a substantial investment (based on both labor and time) requiring significant lead time and are limited based on the desired shape of the component, injection-molding may be appropriate for relatively simple components that are less likely to change or need updates in the foreseeable future. On the other hand, additive manufactured components, in addition to the benefits described above related to customizing density and strength distributions and reducing weight, require little advanced planning such that many additive manufactured components can be altered or redesigned as soon as a computer-aided design model can be created. Because no component-specific tooling (e.g., a mold) is required, additive manufactured components may be particularly well suited for modular components where multiple configurations are envisioned for one component or for subcomponents where different configurations are intended for various applications or environments.

Figure 5A:
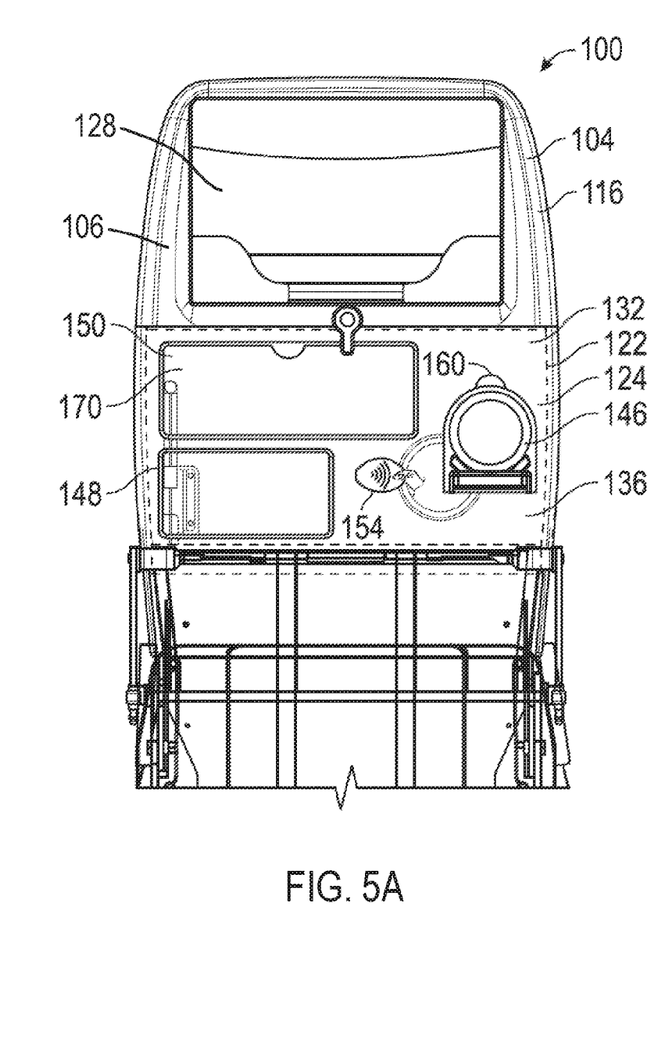
FIGS. 5A and 5B are rear views of the passenger seat assembly of FIG. 2.
Figure 5B:
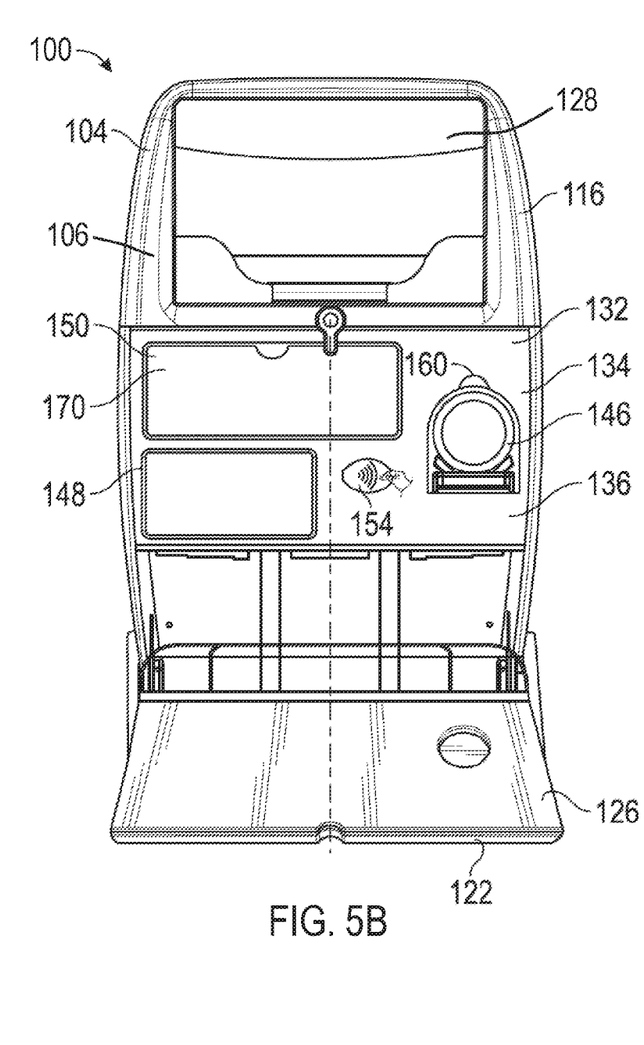

One example of a modular component is the amenities panel 132. FIG. 4 shows a passenger seat assembly 100 with three different configurations (additional configurations of the amenities panel 132 are shown in FIGS. 5A and 5B). In FIG. 4, the left side backrest 104 does not include any convenience features such that the portion of the backrest 104 behind the tray table 122 (when the tray table 122 is stowed) can be optimized to minimize weight and tailored to optimize performance for HIC testing. The center backrest 104 in FIG. 4 includes an amenities panel 132 with a universal holder 148 (which includes a plurality of retainers 158) designed to adapt to a multitude of situations and to be capable of holding various personal items (e.g., passenger items 166A-B). The right side backrest 104 in FIG. 4 includes an amenities panel 132 with more specialized features including, for example, USB ports 152, a wireless charging system 154, and an electronics holder 140. In some embodiments, the provisions for attaching the body 134 to the backrest 104 or the body 134 itself of the amenities panel 132 may be the same for each passenger seat. Each of the backrests 104 shown in FIG. 4 (and/or in FIGS. 5A and 5B) may be modular such that each individual backrest 104 can be manufactured in a similar manner with the ability to include features for different configuration and/or each backrest 104 can be changed after initial manufacture based on a specific customer and/or may be spontaneously changed based on individual passenger preference. Although the convenience features are primarily illustrated as part of the amenities panel 132, it should be understood that the various convenience features described herein may be incorporated into other portions of the passenger seat assembly 100 including, for example, the backrest shroud 106, the upper module 128, and the tray table 122. The convenience features incorporated into these components would have the same appearance as those illustrated in the amenities panel 132 and thus are not illustrated for simplicity. These convenience features may be designed as a component 10 manufactured by additive manufacturing techniques that is modular and/or replaceable, as described above.

Another example of an appropriate application for a component 10 manufactured by additive manufacturing techniques may be the internal structure of the upper module 128. In particular, where the upper module 128 includes an IFE monitor, the mounting structure for the IFE monitor may be additively manufactured. Additive manufacturing this mounting structure allows for more intricate designs for structure such as hinges (allowing for greater range of motion for the monitor) and allows for modularity such that the mounting structure can be replaced/adapted for different/newer monitors. In some embodiments, the latch 164 for securing the tray table 122 is a component 10 manufactured by additive manufacturing techniques.

For embodiments where the seat feature (e.g., backrest shroud 106, upper module 128, tray table 122, amenities panel 132, etc.) includes a specific separate portion that is produced by additive manufacturing techniques (whether temporarily or permanently attached), the additive manufactured component 10 may be attached to the remaining portion of the feature using mechanical fasteners, chemical fasteners, or any other appropriate attachment.

Other components of the passenger seat assembly 100 may include a component 10 manufactured by additive manufacturing techniques. For example, the headrest 120, the armrest 118, forward-facing side 114 of the backrest 104, and the seat base 102 may include (in whole or in part) a component 10 manufactured by additive manufacturing techniques. Cushions and/or padding for these components may be manufactured using additive manufacturing techniques to precisely tune the flex, compression, weight, and other properties. In some cases, using additive manufactured components for cushions allows the elimination of non-desirable materials including certain foam materials because these materials may include increased weight, flammability, or other non-desirable properties.

The components of the passenger seat assembly 100 may be formed of materials including, but not limited to, aluminum, steel, titanium, carbon composite, graphite composite, polyester, nylon, plastic, thermoplastic, fabric materials, ULTEM™ 9085, stainless steel, Inconel, other plastic or polymer materials, other metallic materials, other composite materials, or other similar materials. Moreover, the components of the passenger seat assembly 100 may be attached to one another via suitable fasteners, which include, but are not limited to, screws, bolts, rivets, or other mechanical or chemical fasteners.

In the following, further examples are described to facilitate understanding of aspects of the invention:

Example A. A passenger seat comprising:
at least one seat component comprising a first material;
at least one additive manufactured component comprising a second material, the at least one additive manufactured component comprising a plurality of zones, wherein:
the at least one additive manufactured component is attached to the at least one seat component;
the at least one additive manufactured component comprises a lattice structure; and
each of the plurality of zones comprises different physical properties.

Example B. The passenger seat of Example A or any of the preceding or subsequent examples, wherein the at least one additive manufactured component comprises a material having isotropic properties.

Example C. The passenger seat of Example A or any of the preceding or subsequent examples, wherein each of the plurality of zones comprises a different density.

Example D. The passenger seat of Example A or any of the preceding or subsequent examples, wherein each of the plurality of zones comprises a different geometry of lattice structure.

Example E. The passenger seat of Example A or any of the preceding or subsequent examples, wherein the at least one additive manufactured component is arranged in a head impact region on a rear side of the passenger seat.

Example F. The passenger seat of Example A or any of the preceding or subsequent examples, wherein the at least one additive manufactured component comprises an outer surface that is contiguous with an outer surface of the at least one seat component.

Example G. The passenger seat of Example A or any of the preceding or subsequent examples, wherein the first material of the at least one seat component comprises injection-molded thermoplastic and the second material is different than the first material.

Example H. The passenger seat of Example A or any of the preceding or subsequent examples, wherein the at least one seat component comprises a seat shroud on a rear side of the passenger seat.

Example I. The passenger seat of Example A or any of the preceding or subsequent examples, wherein the at least one additive manufactured component is designed to deflect and absorb more energy based on impact loads compared to the at least one seat component.

Example J. The passenger seat of Example A or any of the preceding or subsequent examples, wherein the at least one additive manufactured component comprises provisions for mounting fasteners for attachment of the at least one additive manufactured component to the at least one seat component.

Example K. The passenger seat of Example A or any of the preceding or subsequent examples, wherein the at least one additive manufactured component comprises provisions for a modular attachment for a removable component on a rear side of the passenger seat.

Example L. The passenger seat of Example K or any of the preceding or subsequent examples, wherein the removable component comprises at least one selected from the group of an electrical charging unit, a coat hook, a tray table, a literature pocket, a mirror, a video monitor, and a cup holder.

Example M. The passenger seat of Example A or any of the preceding or subsequent examples, wherein the lattice structure of the at least one additive manufactured component comprises a three dimensional volumetric structure that includes at least one from the group of tetrahedral, rhombic, hexagonal, and cubic structure.

Example N. An additive manufactured component for a passenger seat comprising:
a lattice structure comprising a three dimensional volumetric structure; and
a plurality of zones, wherein:
the additive manufactured component is attached to a seat component; and
each of the plurality of zones comprises different physical properties.

Example O. The additive manufactured component of Example N or any of the preceding or subsequent examples, wherein the additive manufactured component comprises at least one from the group of a cushion, a headrest, and a rear shroud.

Example P. The additive manufactured component of Example N or any of the preceding or subsequent examples, wherein the additive manufactured component comprises isotropic properties.

Example Q. The additive manufactured component of Example N or any of the preceding or subsequent examples, wherein each of the plurality of zones comprises a different density.

Example R. The additive manufactured component of Example N or any of the preceding or subsequent examples, wherein each of the plurality of zones comprises a different geometry of lattice structure.

Example S. The additive manufactured component of Example N or any of the preceding or subsequent examples, wherein the additive manufactured component is arranged in a head impact region on a rear side of the passenger seat.

Example T. The additive manufactured component of Example N or any of the preceding or subsequent examples, wherein the additive manufactured component comprises an outer surface that is contiguous with an outer surface of the seat component.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
at least one seat component;
at least one additive manufactured component comprising an outer surface and a lattice structure having a first zone and a second zone;
wherein the at least one additive manufactured component is arranged in a head impact region on a rear side of the passenger seat and designed to minimize energy transferred to a passenger's head during impact in a rapid deceleration event;

wherein the first zone is arranged adjacent to the outer surface and second zone is arranged behind the first zone;

wherein, during impact in the rapid deceleration event, the first zone dissipates and distributes energy from the head impact, and the second zone compresses and absorbs energy from the head impact; and wherein the at least one additive manufactured component is attached to the at least one seat component.

2. The passenger seat of claim 1, wherein the at least one additive manufactured component comprises a material having isotropic properties.

3. The passenger seat of claim 1, wherein the second zone has a lower density than the first zone.

4. The passenger seat of claim 1, wherein the first zone of the lattice structure has less empty space than the second zone of the lattice structure.

5. The passenger seat of claim 1, wherein the at least one additive manufactured component comprises an outer surface that is contiguous with an outer surface of the at least one seat component.

6. The passenger seat of claim 1, wherein the at least one seat component is a cushion, a headrest, or a rear shroud.

7. The passenger seat of claim 1, wherein the first zone of the lattice structure is formed of struts that are thicker than struts that form the second zone of the lattice structure.

8. The passenger seat of claim 1, wherein the first zone of the lattice structure has a greater thickness than the second zone of the lattice structure.

9. The passenger seat of claim 1, wherein the first zone of the lattice structure is formed of a different material than the second zone of the lattice structure.

10. The passenger seat of claim 1, wherein the lattice structure of the at least one additive manufactured component comprises a three dimensional volumetric structure that is a tetrahedral structure, a rhombic structure, a hexagonal structure, or a cubic structure.

11. An additive manufactured component for a passenger seat comprising:

an outer surface;

a lattice structure comprising a three dimensional volumetric structure and having a first zone and a second zone;

wherein the additive manufactured component is attached to a seat component and arranged in a head impact region on a rear side of the passenger seat and designed to minimize energy transferred to a passenger's head during impact in a rapid deceleration event;

wherein the first zone is arranged adjacent to the outer surface and second zone is arranged behind the first zone; and wherein, during impact in the rapid deceleration event, the first zone dissipates and distributes energy from the head impact, and the second zone compresses and absorbs energy from the head impact.

12. The additive manufactured component of claim 11, wherein the seat component is a cushion, a headrest, or a rear shroud.

13. The additive manufactured component of claim 11, wherein the additive manufactured component comprises isotropic properties.

14. The additive manufactured component of claim 11, wherein the second zone has a lower density than the first zone.

15. The additive manufactured component of claim 11, wherein the first zone of the lattice structure has less empty space than the second zone of the lattice structure.

16. The additive manufactured component of claim 11, wherein the additive manufactured component comprises an outer surface that is contiguous with an outer surface of the seat component.

17. The additive manufactured component of claim 11, wherein the three dimensional volumetric structure is a tetrahedral structure, a rhombic structure, a hexagonal structure, or a cubic structure.

18. The additive manufactured component of claim 11, wherein the first zone of the lattice structure is formed of struts that are thicker than struts that form the second zone of the lattice structure.

19. The additive manufactured component of claim 11, wherein the first zone of the lattice structure has a greater thickness than the second zone of the lattice structure.

20. The additive manufactured component of claim 11, wherein the first zone of the lattice structure is formed of a different material than the second zone of the lattice structure.

* * * * *